United States Patent [19]

Bookout

[11] Patent Number: 4,949,288
[45] Date of Patent: Aug. 14, 1990

[54] TESTING SYSTEM FOR SAFETY RELIEF VALVES

[75] Inventor: Philip J. Bookout, Marietta, Ga.

[73] Assignee: Movats Incorporated, Kennesaw, Ga.

[21] Appl. No.: 239,773

[22] Filed: Sep. 2, 1988

[51] Int. Cl.$^5$ .............................................. G01L 27/00
[52] U.S. Cl. .................................... 364/558; 73/4 R; 73/168
[58] Field of Search ..................... 73/4 R, 168; 364/558

[56] References Cited

U.S. PATENT DOCUMENTS

| | | | |
|---|---|---|---|
| 4,255,967 | 3/1981 | Grymonprez et al. | 73/4 R X |
| 4,349,885 | 9/1982 | Thompson | 364/558 |
| 4,428,223 | 1/1984 | Trevisan | 73/168 X |
| 4,761,999 | 8/1988 | Thompson | 73/4 R X |

FOREIGN PATENT DOCUMENTS 173182 6/1964 U.S.S.R. .

OTHER PUBLICATIONS

Crosby Vavle & Gage Co.,–"Installation, Operation, and Maintenance Instruction for Crosby Style 6×R×10 HB-BP Self-Activated Nozzle Type Safety Valves with Air Cylinder Actuated (Pneumatically Operated) Auxiliary Lifting Gear", 1975.
Vortech–"Remote Reading SPVD Set Pressure Verification Device", 1984.
American National Standard Terminology for Pressure Relief Devices–"7. Operational Characteristics of Pressure Relief Devices", ANSI B951-1977.

Primary Examiner—Parshotam S. Lall
Assistant Examiner—Edward R. Cosimano
Attorney, Agent, or Firm—Louis T. Isaf

[57] ABSTRACT

A Testing System for Safety Relief Valves includes method and apparatus for (1) detecting the "set point" of a safety relief valve, which set point is defined as an "equilibrium point" at which a selectively applied pulling force pulling on the closure element plus the force on the closure element due to internal chamber pressure equals the springloaded biasing force, and (2) determining the approximate pulling force at the set point, and (3) determining the set pressure within an acceptable degree of accuracy; wherein the Apparatus of the Testing System is, briefly, comprised of an assembly for generating and monitoring a pulling force on the valve closure element, a pressure transducer for monitoring line pressure in the chamber, and a controller/data acquisition/data processing device for detecting the set point, determining the set point pulling force, and calculating the set pressure, and mechanism for "tripping" the force generating assembly to stop the generation of pulling force upon detection of the set point and to, alternately, remove or reverse the pulling force.

30 Claims, 6 Drawing Sheets

TESTING SYSTEM FOR SAFETY RELIEF VALVES

FIELD OF THE INVENTION

This invention relates generally to the field of valve testing devices and, more specifically, devices for testing or measuring the set pressure of safety relief valves.

BACKGROUND OF THE INVENTION

The present invention finds as its environment pressurized lines such as piping, tanks and chambers (referred to herein, generally, as "chambers"), on which are installed safety relief valves positioned at various locations along the chamber. A general understanding of the environment is seen in the specification of U.S. Pat. No. 4,349,885 (Thompson). Conventional safety relief valves, such as the type HB valves manufactured by Crosby Valve and Gauge Company, Wrentham, Massachusetts, and type 1543D valves manufactured by Dresser Valve Co., Alexandria, Louisiana, include, at least, a valve port, in communication with the interior of the chamber, for providing a pressure outlet, and a closure element which is nominally biased against the valve port to seal the port. Typically, the bias is provided by a spring loaded assembly acting on the closure element. The portion of the port against which the closure element rests is often referred to as the seat. The safety valve is designed so that when the internal pressure in the chamber is below a pre-determined threshold, defined as the "set pressure", the valve port is sealed. However, when the pressure within the line exceeds the set pressure, the line pressure is sufficient to overcome the spring bias so that the closure element lifts from the seat and the medium within the chamber may freely escape. In the prior art, safety valves are designed for specifically desired set pressures for various applications.

Understandably, it is desirable to be able to test the safety valve to determine the value of the set pressure (within an acceptable degree of accuracy) on a particular valve and, among other things, to determine whether or not the set pressure has changed from its original, rated value, as installed. Some popular systems known in the art for testing set pressure are described in the Thompson specification (patent No. 4,349,885) and include, without limitation, bench testing systems, which require removal of the valve from the chamber, and certain "on-line" systems, which rely upon the "audible pop" as an indicator that the set pressure has been reached. Because of the shut down of some operations required by bench testing systems, and because of the noise factor and possible harzardous results associated with the "audible pop" systems, Thompson developed a set pressure testing system which provided for remote measurement of the set pressure during on-line operation of the valve. The Thompson device, generally, combines monitoring of a position transducer for determining the relative position of the closure element and the seat with monitoring of a force transducer representing a selectively applied force used to oppose the spring loaded biasing force. More detailed explanation of the Thompson system is found in the above-stated patent No. 4,349,885.

The Thompson device appears to rely upon detected displacement of the closure element by a predetermined distance. While determining, from displacement detection, that the closure element has lifted from its seat is an indication that the set pressure has been reached, it is also a possible indication that the set pressure has been exceeded, and that "pop" has already occurred. This is not an acceptable test procedure in many applications.

BRIEF SUMMARY OF THE INVENTION

Briefly described, the system of the present invention includes method and apparatus for (1) detecting the "set point" of a safety relief valve, which set point is defined as an "equilibrium point" at which a selectively applied pulling force pulling on the closure element plus the force on the closure element due to internal chamber pressure equals the springloaded biasing force, and (2) determining the approximate pulling force at the set point, and (3) determining the set pressure within an acceptable degree of accuracy. The Apparatus of the present invention is, briefly, comprised of an assembly for generating and monitoring a pulling force on the valve closure element, a pressure transducer for monitoring line pressure in the chamber, and a controller/data acquisition/data processing device for detecting the set point, determining the set point pulling force, and calculating the set pressure. Furthermore, mechanism is provided for "tripping" the force generating assembly to stop the generation of pulling force upon detection of the set point and to, alternately, remove or reverse the pulling force.

It is, therefore, an object of the present invention to provide a method and apparatus which determines set pressure independent of the need for detecting a predetermined amount of movement by the closure element.

Another object of the present invention is to provide a method and apparatus which "anticipates" pop during relief valve testing and seeks to lessen the risk of "pop" occurring.

Still another object of the present invention is to provide a safety relief valve testing apparatus which is easy to install and operable from a remote location.

Still another object of the present invention is to provide a force measuring apparatus which interfaces with the valve closure element in a manner which lessens or negates the impact which weight of the test system may have on the test results.

Other objects, features and advantages of the present inventions will become apparant upon reading and understanding this specification, taken in conjunction with the accompanying drawings.

DETAILED DESCRIPTION OF THE PREFERRED EMBODIMENT

Figure 1:
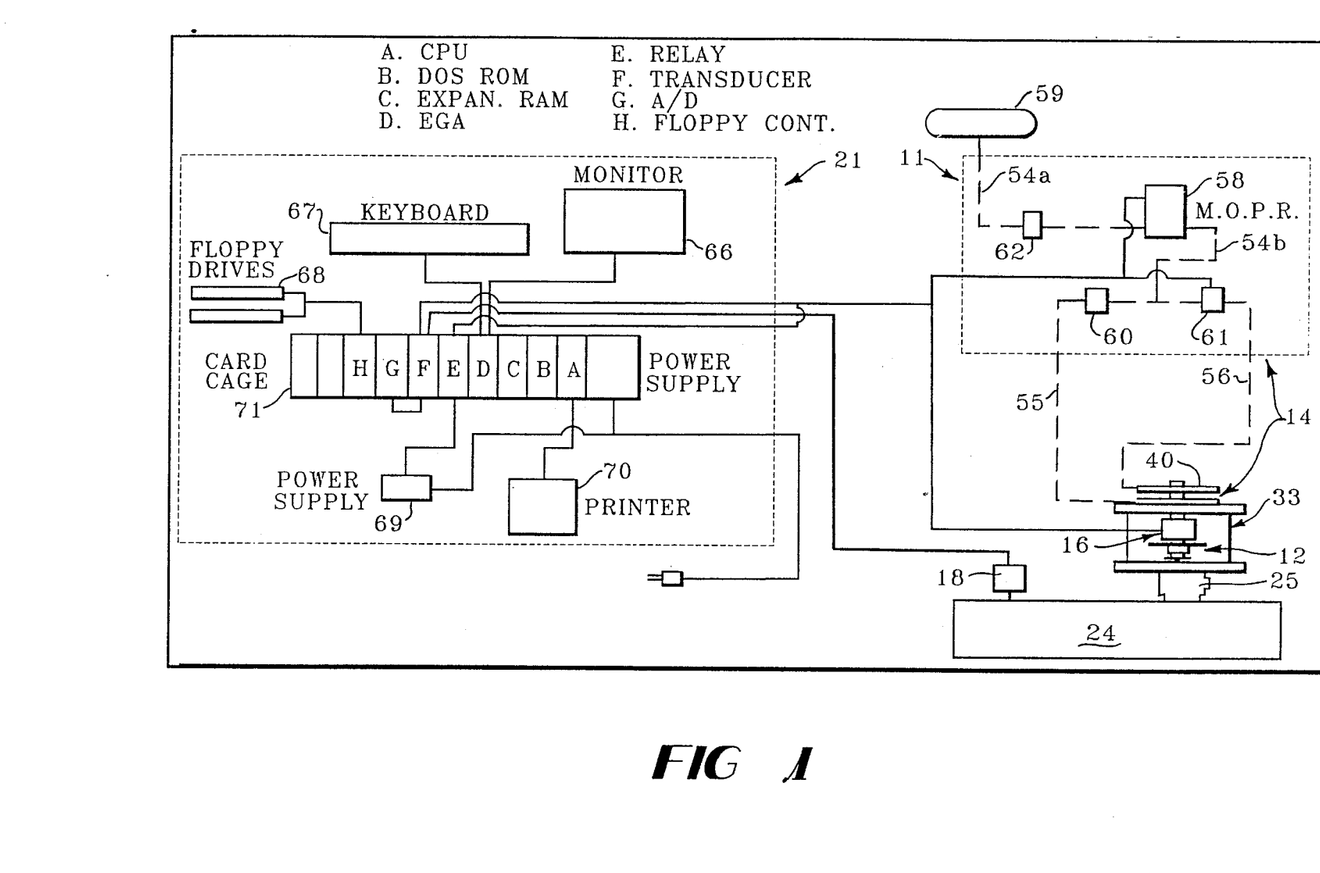
FIG. 1 is a schematic representation of a Safety Relief Valve Testing System in accordance with a preferred embodiment of the present invention.

Referring now in greater detail to the drawings in which like numerals represent like components throughout the several views, FIG. 1 is seen as providing a schematic representation of the Safety Relief Valve Testing System in accordance with the present invention. The testing system of FIG. 1 is seen as generally including a force generating and monitoring assembly 11, a pressure transducer 18 and a controller/data acquisition/data processing device 21. The general components of the force generating and monitoring assembly 11 are seen as a valve gripping mechanism 12, driving force mechanism 14 and force transducer 16. The operating environment of the Safety Relief Valve Testing System is shown in a general manner in FIG. 2 as including a pressure chamber 24 and a safety relief valve 25. Examples of a pressure chamber 24 are a pipe, tank or other chamber containing a medium under pressure. The safety relief valve 25 is one of many conventional valves standard in the industry which typically comprises, at a minimum, some manner of an outlet port 26 in communication with the chamber 24 by which medium under pressure can escape from the valve 25 through the outlet port 26, a closure element 27, a biasing spring 28 and a stem or spindle 29. The outer-most periphery of the outlet port 26 is sometimes referred to as the seat 30 and it is the function of the biasing spring 28 to bias the closure element 27 against the seat by which the closure element seals the outlet port and blocks the escape of pressurized medium from the chamber 24. The stem 29 is typically a component of a lift assist assembly (not shown) which functions to manually lift the closure element 27 from the seat 30 to purposely relieve pressure in the chamber 24.

Figure 2:
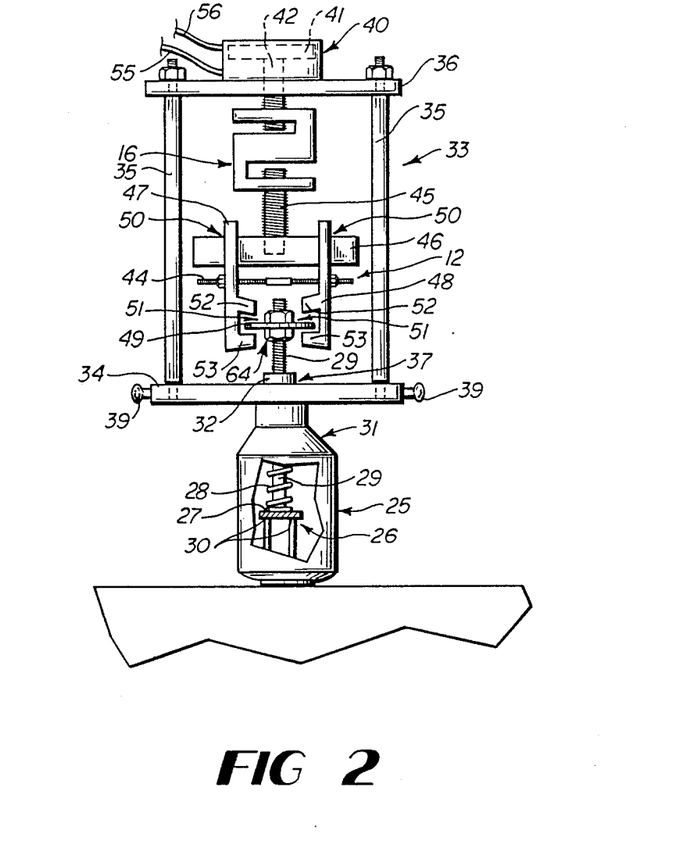
FIG. 2 is a front view of a force generating and monitoring assembly isolated from FIG. 1.

With reference to FIGS. 1 and 2, the valve gripping mechanism 12, driving force mechanism 14 and force transducer 16 of the present invention are seen mounted to the safety relief valve 25 through the assistance of a support super structure 33. The super structure 33 is seen as including a lower plate 34 which rests upon the bonnet 31 of the relief valve 25. Support rods 35, of which there are three (one not shown, for clarity) extend upwardly from the lower plate 34 and support an upper plate 36 at a prescribed distance above the lower plate. Rigidly mounted, as by bolting, to the upper plate 36 is an air cylinder 40. The air cylinder 40 is, in a preferred embodiment, of a ram and piston type where a piston is moved within the cylinder by the force of air entering the chamber under pressure. One example of an acceptable family of air cylinders 40 is the model FOD, double action, flat body air cylinders manufactured by Bimba Mfg. Co. of Monee, Ill. The size of the cylinders 40 is chosen in anticipation of the pulling force to be generated. In alternate embodiments, where size and force are appropriate, hydraulicly operated cylinders are utilized within the scope of the present invention. The ram 42 of the mounted cylinder 40 extends (or is extended) through the upper plate 36 where the ram interfaces with the force transducer 16 and the force transducer 16 in-turn interfaces with the valve gripping mechanism 12. In the preferred embodiment, the force transducer 16 takes the form of a load cell of a type known generally as a tension/compression load cell and the interface between the ram 42 and load cell 16 is, for example, by threading. In the preferred embodiment, the size and compacity of the load cell 16 is chosen in anticipation of the lifting (pulling) force to be measured. An example of an acceptable family of load cells 16 is the model SSM load cells manufactured by Interface, Inc. of Scottsdale, Arizona.

The valve gripping mechanism 12 of the present invention is comprised of four basic components which include the link bar 45, the lift bar 46, two gripping arms 47, 48 and a nut and washer assembly 64. In the disclosed embodiment, the link bar 45 is interfaced with the load cell 16 by threading. The lift bar 46 is threaded to the lower end of the link bar 45. Each gripping arm 47, 48 includes a passage 50 defined in the upper segment of the arm and a cradle 51 defined in the lower segment of the arm. The respective passage 50 accepts, slidably, one end of the lift bar 46. The cradle 51 is formed by two spaced apart fingers 52, 53. The nut and washer assembly 64 define nuts and a washer 49 threaded to the threaded, exposed end of the relief valve stem 29. A tie bolt 44 with accompanying nuts at each end adjustably connects the two gripping arms 47, 48.

With reference again to FIG. 1, the driving force mechanism 14, is seen as comprising the air cylinder 40, mentioned above, connected by delivery hoses 55, 56 and supply hose 54b to a motor operated pressure regulator ("MOPR") 58. The MOPR is of a type typically known in the industry which regulates air flow through the supply hose 54 (54a and 54b) and delivery hoses 55, 56 to the air cylinder 40 in such a manner as to provide a linearly increasing input force (driving force) to the ram 42. An example of an acceptable motor operated pressure regulator for use with the disclosed embodiment is that manufactured by Tescom Corporation of Elk River, Minn., as regulator model 26-1600 series with model 70-2000 motor operator. The driving-force mechanism 14 is also seen as including an air reservoir 59 from which air under pressure is supplied through supply hose 54 to the delivery hoses 55, 56, and solenoid valves 60, 61 for controlling the flow of air through the respective hoses 55, 56. An example of an acceptable solenoid valve 60, 61 for use with the preferred embodiment is that manufactured by Fabco-Air, Inc. of Gainesville, Fla., as model 83. An air filter 62 is shown in the supply hose 54.

The pressure transducer 18 is seen as mounted to the pressurized chamber 24 in a manner known in the industry for measuring the internal pressure (also referred to as the "line pressure") of the pressurized medium within the chamber. An example of a pressure transducer acceptable for use with the disclosed embodiment of the present invention is that operated by SENSOTEC, INC. of Columbus, Ohio, as model TJE.

The controller/data acquisition/data processing device 21 is, in the preferred embodiment, a software operated, microprocessor based, computer-type device, with associated hardware, which functions to (1) provide control signals and/or power signals to the driving force mechanism 14, force transducer 16 and pressure transducer 18, and (2) receive output data signals from the load cell (force transducer) 16 and from the pressure transducer 18, and (3) process collected data. A flow chart of the software driven function of the controller/data acquisition/data processing device 21 is seen in FIG. 3.

Figure 3A:
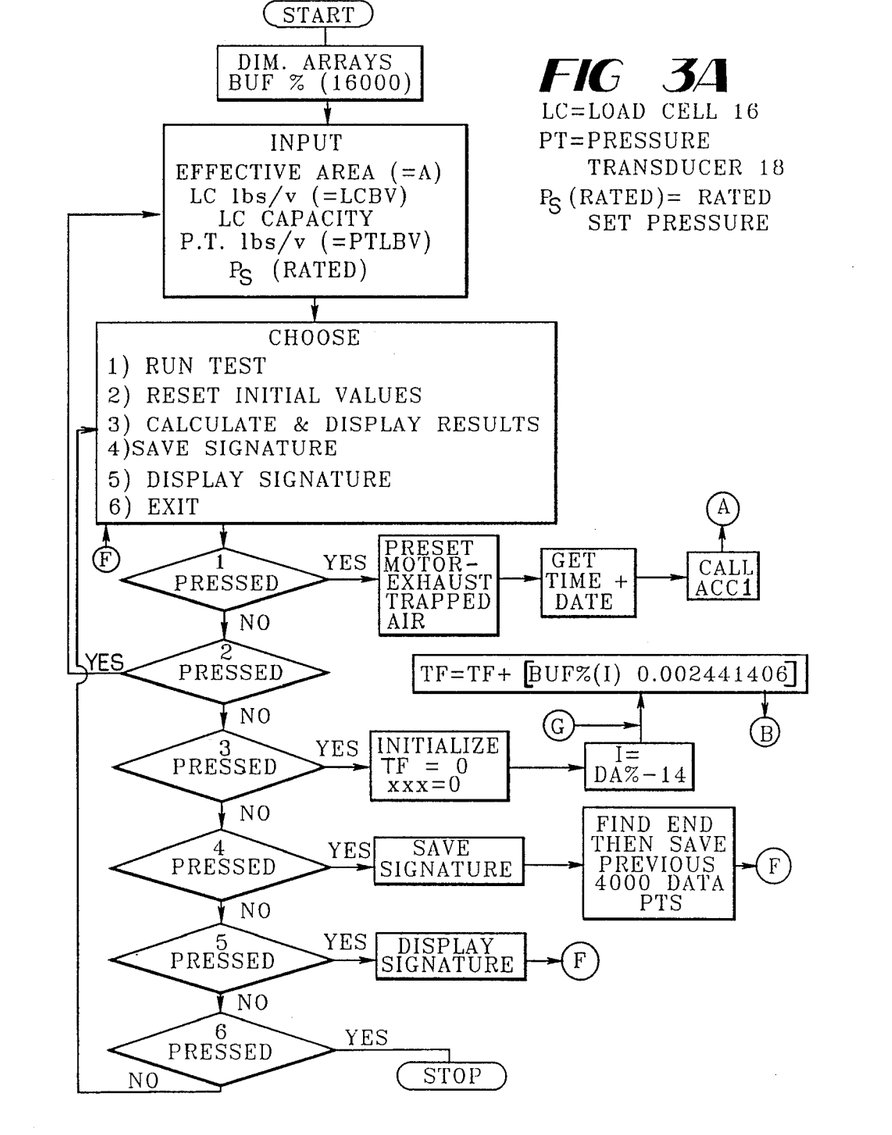
FIGS. 3A, 3B and 3C are a flow chart representation of the operational definition of the controller/data acquisition/data processing device of the testing system of FIG. 1, in accordance with one embodiment of the present invention.
Figure 3B:
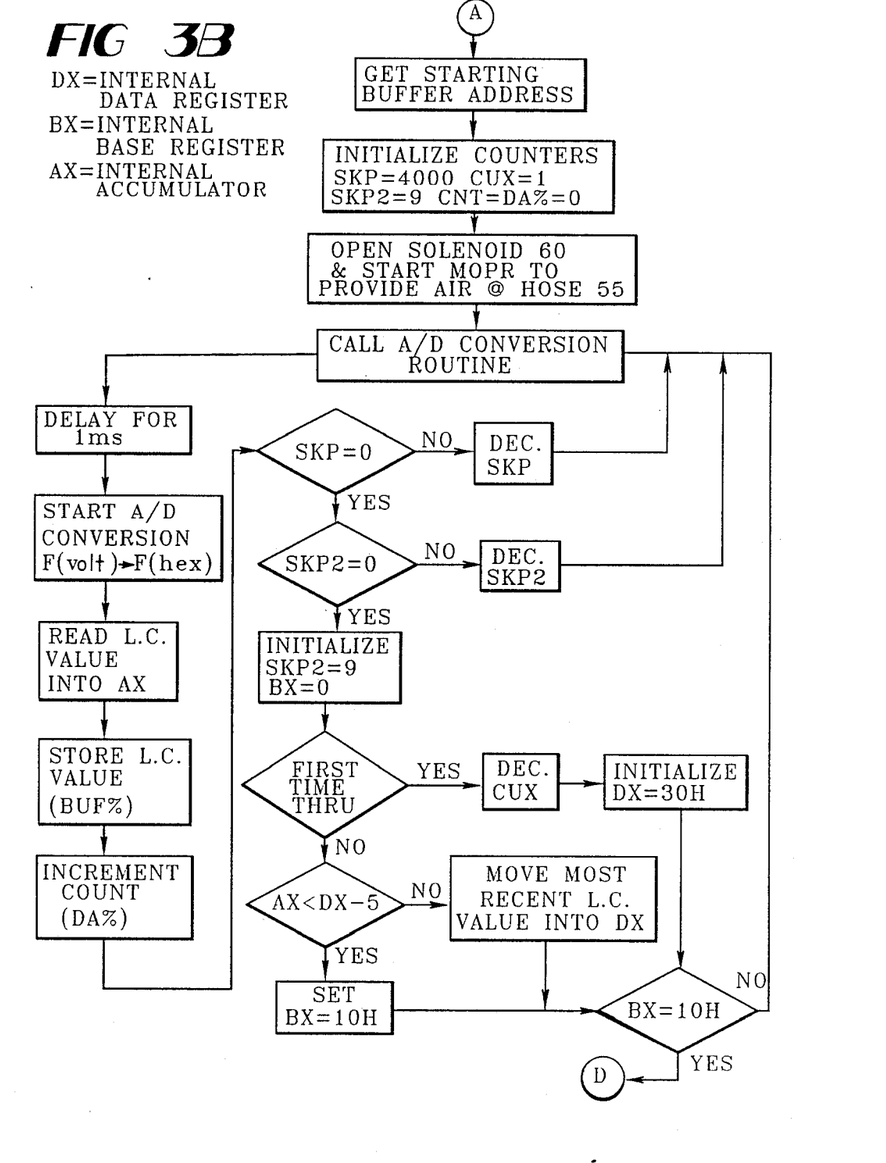
Figure 3C:
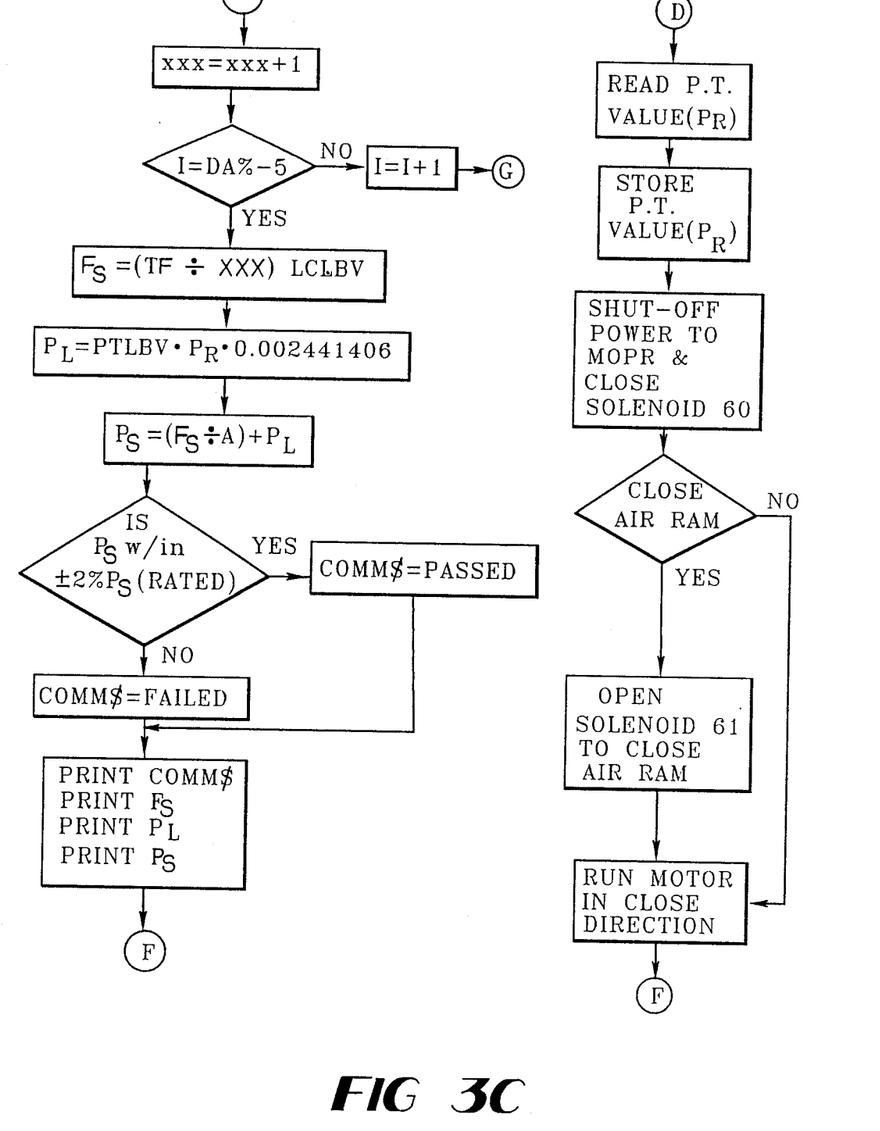

The flow chart on FIGS. 3A, 3B, 3C describes the operation of one, acceptable computer program that controls the computer 21 of FIG. 1. The program begins by allocating memory for data storage (see "DIM.

ARRAYS BUF% (16000)" FIG. 3A). It then prompts the user for values related to the equipment being used ("EFFECTIVE AREA (=A)"; "LC lbs/V (=LCLBV)"; "LC CAPACITY"; "PT lbs/V (=PTLBV)"; "$P_{S\ (rated)}$"). "LC" stands for Load Cell 16, "PT" for Pressure Transducer 18, "$P_{S(rated)}$" for the rated set pressure. The program then displays a menu which directs the user to choose an option {"CHOOSE 1) RUN TEST 2) RESET INITIAL VALUES 3) CALCULATE & DISPLAY RESULTS 4) SAVE SIGNATURE 5) DISPLAY SIGNATURE 6) EXIT"}. The first possible choice is RUN TEST.

1. By pressing (1), the RUN TEST option is selected. It first presets the motor and exhausts trapped air. The time and date are then read from memory. The program then calls the ACC1 routine, FIG. 3B at (A).

The ACC1 routine begins by reading the starting buffer address. It then initializes the counters ("SKP=4000"; "CUX=1"; "SKP2=9"; "CNT=DA%=0"). Solenoid 60 is then opened, and the M.O.P.R. begins to provide air to hose 55. The A/D conversion routine is then called. This routine delays for 1 ms and starts the A/D conversion from force in volts to force in hex. The Load Cell value is then read into "AX" and stored in "BUF%". The counter "DA%" is then incremented. If the counter "SKP" is then not equal to 0, "SKP" is decremented, and the conversion routine continues. When "SKP" equals zero, "SKP" is checked. If "SKP" does not equal zero, "SKP" is decremented, and the conversion routine continues. When "SKP" equals zero, variables are then initialized ("SKP2=9"; "BX=0"). If it is the first time in this operation that "SKP" has equaled zero, "CUX" is decremented, and "DX" is initialized to equal 30H. "BX" is then checked after this sequence of steps to see if "BX" is equal to 10H. If, however, this is not the first time in this operation that "SKP" has equaled zero, the program checks the condition of "AX" being greater than "DX-5". If this condition is true, "BX" is set to equal 10H, and the program also checks to see if "BX" is equal to 10H after these steps. However, if the condition of "AX" being greater than "DX-5" is false, the most recent load cell value is moved into "DX", and the program also checks to see if "BX" is equal to 10H after these steps. If "BX" is not equal to 10H after these various combinations of steps, the A/D conversion routine is continued. If however "BX" does equal 10H, the program continues on FIG. 3C at (D). Note: "DX", and "BX", stand for internal data registers; "AX" for an internal accumulator.

On FIG. 3C at (D), the pressure transducer value ("PT") is read and stored as "$P_R$". M.O.P.R. and Solenoid 60 power is then removed. The user is then given the choice to "Close Air Ram?" If the user then wants to close the Air Ram, Solenoid 61 is opened. If the user had not wanted to close the Air Ram, or after Air Ram has been closed, the motor is run in the close direction, and the program moves back to the menu on FIG. 3A at (F).

2. By pressing (2), the RESET INITIAL VALUES option is selected. The program again prompts the user for the same input requested above.

3. By pressing (3), the CALCULATE AND DISPLAY RESULTS option is selected. "TF" and "XXX" are initialized to equal zero, and "I" is defined as "DA%-14". "TF" is then calculated as:

"TF+[BUF%(I) * 0.002441406]", and the program moves on to FIG. 3C at (B). On FIG. 3C at (B), "XXX" is then incremented by one. The program then determines if "I" is equal to "DA%-5". If these terms are not equal, "I" is incremented, and the program loops back to FIG. 3A at (G) to recalculate "TF". This loop continues until "I" is equal to "DA%-5". When "I=DA%-5", then "$F_S$" is calculated as "$F_X$=(TF / XXX) * LCLBV"; "$P_L$" is calculated as "$P_L$=PTLBV * $P_R$ * 0.002441406"; and "$P_S$" is calculated as "$P_S$=($F_S$/A)+$P_L$". The program then determines if "$P_S$" is within ±2% of "$P_{S\ (rated)}$". If this condition is true, "COMM$=PASSED", but if this condition is false, "COMM$=FAILED". "COMM$", "FX", "$P_L$", and "$P_S$" are then printed, and the program moves back to the menu on FIG. 3A at (F).

4. By pressing (4), the SAVE SIGNATURE option is selected. The program saves the signature of the load cell by saving the most recent 4000 data values. The program then moves back to the menu on FIG. 3A at (F).

5. By pressing (5) the DISPLAY SIGNATURE option is selected. The program then merely displays the signature on the monitor. Again, the program moves back to the menu on FIG. 3A at (F).

6. By pressing (6), the EXIT option is selected. The program then simply stops execution.

This flow chart for one, acceptable control and data collecting program is discussed further under "operation", below.

Hardware associated with the function of the controller/data acquisition/data processing device 21 will become apparent to one skilled in the art upon understanding of the flow charts and this specification. In the disclosed embodiment represented by the drawings, acceptable examples of such hardware include: MONITOR 66 (displaying device), KEYBOARD 67, FLOPPY DRIVES 68 (storing device), POWER SUPPLY 69, PRINTER 70, and CARD CAGE 71, which card cage contains printed circuit boards with circuitry to perform required functions (including, but not limited to, recording functions). These are merely examples of elements that could be used to provide the controller/data acquisition/data processing device 21 with recording, displaying, and storing means for performing required functions.

Installation. The valve stem gripping mechanism 12, driving force mechanism 14 and force transducer 16 are linked and mounted to the support super structure 33 as previously described. The gripping arms 47, 48 are temporarily moved to the outer extremes of the lift bar 46. The super structure 33 is mounted to the top 31 of the to-be-tested safety relief valve 25. The valve 25 is prepared by removing the standard "lift-assist" assembly (not shown) from the exposed end of the valve stem 29. The nut and washer assembly 64 is threaded to the exposed end of the valve stem 29 as shown. Whereas methods of attaching the superstructure 33 to the valve 25 will vary for valves of varying design, the embodiment disclosed in the drawing figures depicts a valve (of a standard configuration such as the Dresser Valve type 1543D) which is formed with a neck 32, formed at the top end of the bonnet 31, through which the valve stem 29 freely moves. The lower plate 34 of this disclosed embodiment includes a central passage 37; and the super structure 33 is seen as setting upon the bonnet 31 with the neck 32 protruding through the plate passage 37. The lower plate 34 is held to the neck 32 by set bolts 39 extending radially through the lower plate 34 to pinch against the neck.

With the superstructure 33 now supported on the valve neck 32, the lift bar 46 is adjusted relative to the link bar 45, as by threading up or down, to align the cradles 51 of the arms 47, 48 with the washer 49. The gripping arms 47, 48 are then moved toward one another along the lift bar 46 and the tie bolt assembly 44 is adjusted to prevent outward movement of the arms. It is noted that, prior to the introduction of any outside forces, gaps exist between the washer 49 and the upper fingers 52 and the lower fingers 53. The size of these gaps, impacted by the distance between the upper finger 52 and lower finger 53 and the thickness of the washer 49, is chosen with the amount of travel of the air cylinder piston 41 considered. The load cell readout is calibrated to "0", to compensate for the hanging weight of the valve gripping mechanism 12. Air hoses 55, 56 are connected to the air cylinder 40, which has been mounted to the superstructure 33 upper plate 36. The solenoid valves 60, 61, MOPR 58, supply hoses 54a, 54b, reservoir 59 and filter 62 are connected as described above and in a manner readily apparant to one skilled in the art. The pressure transducer 18 is installed at the chamber 24 in a manner known in the art. The pressure transducer 18, force transducer 16, solenoids 60, 61 and MOPR 58 are connected to the controller/data acquisition/processing device 21 as shown in FIG. 1 and by connecting methods readily apparant to one in the art.

Figures 4, 4A:
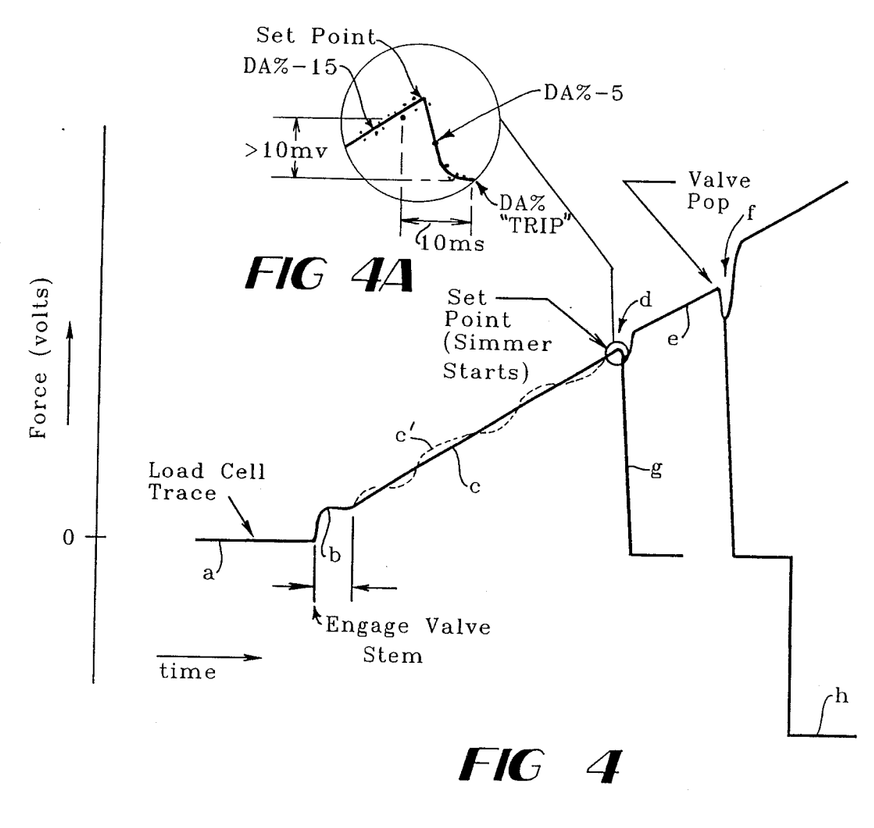
FIG. 4 is a graphic representation of a pulling force vs time curve acquired in accordance with the present invention.
FIG. 4A is an isolated, enlarged view of one example of the force/time curve of FIG. 4, surrounding the SET POINT.

Operation. With the Safety Relief Valve Testing System installed as described above and in the drawings, the user initiates operation of the Testing System by providing power to and switching on the combined controller/data acquisition/data processing device 21 (hereinafter, also, generally referred to as the "computer 21"). Power is thereby provided to the transducers 16, 18 which immediately begin monitoring of the respective pulling force (F) at the load cell 16 and line pressure (P$_L$) at the pressure transducer 18. The user then initiates operation of the software driven computer 21 to perform the functions as clearly outlined in the flow charts of FIGS. 3A, 3B and 3C. The flow charts are believed to be self explanatory, and the following comments are offered to assist and clarify:

1. Attention is directed to FIG. 4 which is a representative signature of a force vs time relationship acquired during one test cycle on one valve 25. Whereas the curve will vary for different valves and varying conditions of the valve, this signature is representative of the general force characteristics and features to be expected as a result of testing in accordance with the present invention. By way of interpretation: the signature begins at left with a horizontal line (a) representing the load cell trace prior to the time that the lower fingers 53 of the valve gripping mechanism 12 engage the washer 49 on the valve stem 29; a non-linear jump (b) is introduced by the initial period after engagement of the fingers 53 and washer 49; a portion of linearly increasing slope (c) represents linearly increasing pulling force at the load cell 16 resulting from linearly increasing driving force applied to the air cylinder piston 41 by action of the pressure regulator (MOPR) 58 through hose 55; the dotted line (c') indicates a generally increasing yet wavering pulling force (as measured) resulting from vibrations, oscilations and other noise while the driving force (not measured) remains linearly increasing; a first major depression or "glitch" (d) in the pulling force is interpreted in accordance with the present invention as identifying the SET POINT (which is at the beginning of the depression) and beginning of "simmer"; for the definition of a "major depression" or "glitch", in accordance with the present invention, see below; another section (e) of increasing pulling force represents the period of "simmer"; and the second major depression or glitch (f) represents pop. Glitches occur when the pulling force and the force due to the chamber pressure begin to equalize the springloaded biasing force (SET POINT) and when the closure element 27 separates from the seat (30) (POP). The present invention merely takes advantage of when the glitches occur, i.e. they signify that a SET POINT or POP has occurred, is occurring, or is about to occur, and does not attempt to specifically define their cause. FIG. 4A is an enlarged view of the immediate area around the SET POINT, shown in FIG. 4. Each point represents a pulling force sample (i.e. datapoint or value), and the curve is drawn to follow these samples; the SET POINT is labeled as the beginning of the depression; the range of values to be averaged to determine a representation of the SET POINT are labeled (DA% - 15 through DA%); the predefined 10 mV drop over a 10 ms period is also labeled.

2. Whereas sections "e" and "f" of the force curve of FIG. 4 are measured and recorded in certain embodiments of the present invention, for example, for experimentation and empirical data collecting, or for use in "Safe" environments where there is no concern about noise pollution or escape of hazardous, pressurized medium from the chamber 24, the preferred embodiment provides for an immediate "tripping" or shut-off of driving forces and thus pulling forces in an effort to prevent extended simmer (e) and pop (f). This "trip" occurs upon detection of the "glitch" (d). (See Step—"Shut off Power to MOPR and Close Solenoid 60"—FIG. 3C) The resultant shut off is represented by the rapidly decreasing force line (g). Also, the preferred embodiment is provided with the second solenoid 61 and a double action air cylinder 40 whereby the stem 29 and closure element 27 can be selectively, forceably closed after "trip". (See Step—"Close air ram?"—FIG. 3C.) The resultant, closing force is represented by the negative force line (h), which in the specific example of FIG. 4, shows a situation where the system "missed" the SET POINT glitch and "tripped" at the "POP" glitch. Given the above functional and other information, the operation of the MOPR 58 and various solenoids 60, 61 is considered understood and requiring no more detailed explanation. It can be seen that the top fingers 52 of the gripping mechanism 12 engage the washer 49 during the valve, forced-closing operation. Note that, curve segments "g" and "h" and any segments "e" and "f" beyond the "trip" point of the system will not be actually recorded by the apparatus of the disclosed embodiment; but these segments are included herein for explanation and clarification purposes.

3. The embodiment as disclosed in the flow charts of FIGS. 3A–3C is seen as taking measured, pulling force (F) samplings in 1 millisecond increments (see step—"Delay for 1 ms"—FIG. 3B). Whereas other incremental samplings are allowed in alternate embodiments within the scope of the present invention, this 1 ms increment is preferred based on the inventors present experience.

4. The embodiment as disclosed in the flow charts of FIGS. 3A–3C is seen as postponing the processing (i.e. comparison) of force data for a period of four thousand milliseconds (See Step—"initialize SKP=4000"—FIG. 3B). Whereas other postponing periods are acceptable in alternate embodiments within the scope of the present invention, this 4000 ms (4 sec.) period is preferred, based on the inventors present experience, for avoiding the instability of start-up (see curve segments "a" "b" of FIG. 4).

5. The embodiment as disclosed in the Flow Charts of FIGS. 3A-3C is seen as comparing every tenth (10th) data point (i.e. every 10 ms) (see steps—"initialize SKP2=9" and "is SKP2=0?"—FIG. 3B) to see if a "major depression or glitch" has occurred within that 10 ms period. Furthermore, the comparison is made between the subject data point and the tenth previous data point. Whereas other comparison frequencies and other comparison spans are acceptable in alternate embodiments within the scope of the present invention, this 10 ms comparison frequency and this every tenth data point comparison span are preferred, based on the inventors present experience, for timely and adequately noting the "glitch" at the SET POINT.

6. The preferred embodiment is seen as defining the "major depression" or "glitch" at the SET POINT as being a predetermined voltage (force) drop within predefined time span. The disclosed example utilizes the definition of at least a ten millivolt (actually, 12.20703 mv) drop occurring within a ten millisecond interval (see step—"is AX less than DX-5?"—FIG. 3B; where, for the present embodiment, 1 count=0.002441406 volts). Refer, for example, to FIG. 4A. Other definitions of "major depression" or "glitch" are acceptable in alternate embodiments and, in some cases, even required by the characteristics of the valve 25 being tested; however, this definition is preferred, based on the inventors present experience, for weeding out false glitches or unimportant slope changes caused by vibrations, oscilations and other noise (i.e. dotted segment "c'" of FIG. 4). NOTE that the present invention seeks to avoid "POP" by detecting the SET POINT glitch and, thus, tripping prior to "POP". However, should the SET POINT glitch be missed, and the "POP" glitch is detected, the system will trip and the valve can be forceably closed (see above). "Missing" the SET POINT glitch is a possible indication that a different predetermined voltage drop and/or different predefined time span is required for the particular valve being tested.

7. In accordance with the present invention, the SET POINT has occurred at some point prior to the last data point at "trip". The preferred embodiment is seen as calculating a force ("$F_S$") to represent, as closely as possible, the pulling force at SET POINT by: ignoring the last five data points taken before "trip" or shut off; and adding together the ten data points prior to those last five (see steps—"I=DA% - 14" of FIG. 3A; "is I=DA% - 5" of FIG. 3C; and "TF=TF+[BUF%(I) ·0.002441406]" of FIG. 3A); and then taking the average of these 10 points (See Step—"$F_S$=[TF/xxx]·LCLBV). (See also, FIG. 4A.) Whereas other or variant calculation factors are acceptable in alternate embodiments within the scope of the present invention, the disclosed embodiment is preferred, based on the inventors present experience, for calculating the pulling force at the SET POINT within acceptable degree of accuracy. As a clarification of terms, $F_S$ "represents" the pulling force at the SET POINT, since $F_S$ is calculated by the stated averaging or otherwise, and it is not necessarily exactly the pulling force at the SET POINT.

8. The present invention calculates the SET PRESSURE ("$P_S$") utilizing the formula $P_S=P_L +(F_S/A)$, where $P_L$ is the line pressure acquired from the pressure transducer 18 at the trip point (See Step—"Read P. T. Value ($P_R$)" and "$P_L$=PTLBV * $P_R$ * 0.002441406" of FIG. 3C); where $F_S$ is the calculated pulling force, representing the pulling force at the SET POINT; and A is the effective area of the port 26 as determined by industry accepted methods.

9. The preferred embodiment is seen as utilizing analog-to-digital conversion and has adopted the A/D conversion factor of one count = 0.002441406 volts; however, the scope of the present invention is not to be limited thereby.

10. It is seen that, in the preferred embodiments displaying and storing functions are provided utilizing appropriate display and recording devices.

11. The preferred embodiment "Passes" or "Fails" the tested valve 25 by comparing the calculated SET PRESSURE with the rated SET PRESSURE. If the calculated $P_S$ does not equal the rated set pressure within a prescribed tolerance, the valve is marked "FAILED". In the disclosed embodiment, the tolerance is given as ±2% (See Step: "is $P_S$ w/in ±2% $P_S$(rated)?"—FIG. 3C), however, the actual tolerances are typically chosen by the user facility or other user and the scope of the present invention is not to be limited by the stated tolerance.

12. By way of clarification, this "prescribed tolerance" by which the calculated SET PRESSURE is compared to rated set pressure for PASS/FAIL purposes is different from the "acceptable degree of accuracy" associated with calculation of the pulling force ($F_S$) at SET POINT which, for example utilizes an average of measured forces over time or other calculation factors.

13. Evaluation of a displayed signature assists in determining where, along the force curve of FIG. 4, the system detected a glitch and tripped.

As discussed above, the disclosed embodiment of the present invention detects the "glitch" at the SET POINT by comparing every tenth force data point with the data point ten before it to determine if the ten millivolt, predetermined voltage drop has occurred within that comparison span; and the comparision frequency is every ten seconds. Refer to FIG. 4A. Without limiting the scope of the present invention, a few alternate techniques are briefly discussed below:

a. One alternate embodiment utilizes a comparison frequency of every one millisecond, thus comparing every data point with, for example, the tenth prior data point to see if the predetermined voltage drop has occurred.

b. Another alternate embodiment takes a predetermined number of data points and averages them together, then moves one data point and averages them and so on. If the difference in the average changes by a predetermined amount, the system "trips".

c. Another alternate embodiment, takes a predetermined number of data points and averages them together, then moves to the next group of data points and averages them. If the difference between the averages changes by a predetermined amount, the system "trips".

d. Still another alternate embodiment, takes a predetermined number of data points and averages them together, then moves one data point and averages them, then calculates the slope of the averages, and so on. If the slope changes by a predetermined amount, the system "trips".

Whereas, it is preferred that the driving force mechanism 14 comprise an MOPR 58 for providing linearly increasing driving force to the air cylinder 40, non-linearly increasing driving force is contemplated within less preferred embodiments of the present invention. In such embodiments, it is important that the non-linearity is not so great as to create a "major depression," within the definition of that embodiment, which preempts the SET POINT glitch.

Whereas, the present invention has been described in detail with specific reference to preferred embodiments thereof, it will be understood that variations and modifications can be effected within the spirit and scope of the invention as described hereinbefore and as defined in the appended claims.

I claim:

1. Method of determining the set pressure of a safety relief valve whose function is to relieve pressure in a pipe or like chamber, which relief valve includes, at least, an outlet port from which medium under pressure escapes from the chamber, a seat defining the open end of the outlet port, a closure element removably resting on the seat for blocking escape of medium from the outlet, and biasing means for exerting a biasing force on the closure element to hold the closure element on the seat, the set pressure being a pressure which must be exceeded to overcome the biasing force, said method of determining the set pressure comprising the steps of:
   exerting a pulling force on the valve closure element which pulling force is opposite the biasing force;
   increasing the pulling force over time;
   measuring the pulling force over time and collecting resultant force/time data;
   detecting, by evaluation of the collected force/time data, that a set point has been achieved where the pulling force approximates the difference between the biasing force and the force on the closure element due to internal pressure in the chamber;
   determining a force ($F_S$) representing the pulling force at said set point;
   determining internal pressure ($P_L$) of the chamber; and
   calculating the set pressure ($P_S$) utilizing the formula:

$$P_S = P_L + F_S/A,$$

where A is the effective area of the port.

2. Method of claim 1, wherein the detecting step comprises, at least, the step of detecting a change in the pulling force which change has exceeded a preestablished amount over a predefined period of time.

3. Method of claim 1, wherein the determining step includes, at least, the step of calculating the average of "m" measured pulling forces occurring at least "n" data points prior to the point in time of detection that a set point has been achieved, wherein "m" is a positive integer and "n" is 0 or a positive integer.

4. Method of claim 1, further comprising the step of terminating the exerting step in response to detection that a set point has been achieved.

5. Method of determining the set pressure of a safety relief valve whose function is to relieve pressure in a pipe or like chamber, which relief valve includes, at least, an outlet port from which medium under pressure escapes from the chamber, a seat defining the open end of the outlet port, a closure element removably resting on the seat for blocking escape of medium from the outlet, and biasing means for exerting a biasing force on the closure element to hold the closure element on the seat, the set pressure being a pressure which must be exceeded to overcome the biasing force, said method of determining the set pressure comprising the steps of:
   connecting a pulling device to the valve closure element;
   applying a driving force to the pulling device to exert a pulling force on the valve closure element which pulling force is opposite the biasing force;
   increasing the driving force to increase the pulling force over time;
   measuring the pulling force over time and collecting resultant force versus time data;
   detecting, through processing of the pulling force versus time data, that a set point has been achieved where the pulling force approximates the difference between the biasing force and the force on the closure element due to internal pressure in the chamber;
   determining a force ($F_S$) representing the pulling force at said set point;
   determining internal pressure ($P_L$) of the chamber; and
   calculating the set pressure ($P_S$) of the relief valve utilizing the formula:

$$P_S = P_L + F_S/A,$$

where A is the effective area of the port.

6. Method of claim 5, wherein the processing step includes, least:
   noting a pulling force at one data point in time;
   advancing "X" data points in time to a new data point, where "X" is a positive integer;
   comparing the pulling force at the new data point with the pulling force at the data point "Z" points prior to the new data point where "Z" is an integer; and
   repeating the advancing and comparing steps; and
   wherein the detecting step includes the step of detecting a change in the pulling force which change has exceeded a preestablished amount over a span of "Z" data points.

7. Method of claim 5, wherein the processing step includes, at least, the steps of:
   averaging together a set of a predetermined number ("Y") of data points;
   advancing "X" data point(s) in time to a new data end point, wherein "X" is an integer greater than 1 and less-than-or-equal-to "Y";
   averaging together a set of the same predetermined number ("Y") of consecutive data points with the new data end point as the last in time;
   comparing the average of the most recent set of data points with the average of the next preceding set of data points; and
   repeating the advancing, averaging and comparing steps; and
   wherein the detecting step includes the step of observing a change in the compared averages of one set of data points with the next preceding set of data points, which change has exceeded a preestablished amount.

8. Method of claim 5, wherein the processing step includes, at least, the steps of:

averaging together a set of a predetermined number ("Y") of consecutive data points;

advancing "X" data point(s) in time to a new data end point, wherein "X" is an integer greater than 0 and less-than-or-equal-to "Y";

averaging together a set of the same predetermined number ("Y") of consecutive data points with the new data end point as the last in time;

calculating the slope of the averages plotted over time;

repeating the advancing, averaging and calculating steps; and wherein the detecting step includes the step of observing a change in the slope which change has exceeded a pre-established amount.

9. Method of claim 5, further comprising the step of ceasing the pulling force in response to detection that a set point has been achieved.

10. Method of claim 5, further comprising the steps of recording, displaying and storing one or more of collected, processed and calculated data.

11. Method of claim 5, further comprising the step of continuously monitoring the internal pressure of the chamber.

12. Apparatus for testing a safety relief valve whose function is to relieve pressure in a pipe or like chamber, which relief valve includes, at least, an outlet port from which medium under pressure escapes from the chamber, a seat defining the open end of the outlet port, a valve closure element removably resting on the seat for blocking escape of medium from the outlet port, biasing means for exerting a biasing force on the closure element to hold the closure element on the seat, and lift assist mechanism associated with the closure element by which the closure element can be lifted off the seat, said apparatus comprising:

pulling device removably connected to the lift assist mechanism;

driving force means for applying a driving force to said pulling device to exert a pulling force on the closure element through the lift assist mechanism;

force transducer means for measuring said pulling force;

data acquisition means for acquiring pulling force data from said force transducer means over time; and processing means for processing said acquired pulling force versus time data and for detecting, through processing of the pulling force versus time data, that a set point has been achieved where the pulling force approximates the difference between the biasing force and the force on the closure element due to internal pressure in the chamber.

13. Apparatus of claim 12, wherein the processing means comprises, at least means for detecting that a change in the pulling force has exceeded a preestablished amount over a predefined period of time.

14. Apparatus of claim 12, wherein said processing means comprises, at least:

means for comparing said pulling force measured at one point in time with said pulling force measured at a previous point in time; and means for detecting that said pulling force has changed between said previous point in time and said one point in time by a preestablished amount.

15. Apparatus of claim 12, further comprising quick release means responsive to said processing means for ceasing the pulling force immediately upon detection that said set point has been achieved.

16. Apparatus of claim 12, further comprising means for recording, displaying and storing acquired and processed data.

17. Apparatus of claim 12, wherein said driving force means comprises, at least, regulator means for applying a linearly increasing driving force to said pulling device.

18. Apparatus for testing a safety relief valve whose function is to relieve pressure in a pipe or like chamber, which relief valve includes, at least, an outlet port from which medium under pressure escapes from the chamber, a seat defining the open end of the outlet port, a valve closure element removably resting on the seat for blocking escape of medium from the outlet port, biasing means for exerting a biasing force on the closure element to hold the closure element on the seat, and a stem connected to the valve closure element by which the closure element can be lifted, said stem including, at least, an exposed, threaded end opposite the valve disk, said apparatus comprising:

a fluid driven force means for converting an input force to a pulling force at an output element;

support structure means for supporting said force means above the relief valve;

gripping means for gripping the exposed end of the stem;

force transmitting linkage for connecting said output element of said force means to said gripping means;

force transducer means for measuring said pulling force;

data acquisition means for acquiring pulling force data from said force transducer means over time; and processing means for processing said acquired pulling force versus time data and for detecting, through processing of the pulling force versus time data, that a set point has been achieved where the pulling force approximates the difference between the biasing force and the force on the closure element due to internal pressure in the chamber.

19. Apparatus of claim 18, wherein the processing means comprises, at least means for detecting that a change in the pulling force has exceeded a preestablished amount over a predefined period of time.

20. Apparatus of claim 18, wherein said processing means comprises, at least:

means for comparing said pulling force measured at one point in time with said pulling force measured at a previous point in time; and means for detecting that said pulling force has changed between said previous point in time and said one point in time by a preestablished amount.

21. Apparatus of claim 18, further comprising solenoid means for halting said input force to said force means upon detection that said set point has been achieved.

22. Apparatus of claim 18, wherein said fluid driven force means comprises, at least, regulator means for applying a linearly increasing input force.

23. Apparatus of claim 18, wherein said input force of said fluid driven force means is provided by hydraulic fluids under pressure acting on a surface.

24. Apparatus of claim 18, wherein said input force of said fluid driven force means is provided by pneumatic fluids under pressure acting on a surface.

25. Apparatus of claim 18, wherein said force transducer means comprises, at least, a load cell which defines an element of said force transmitting linkage.

26. Apparatus of claim 18, wherein said gripping means comprises, at least:
   a washer element attached to the exposed end of the stem, and
   hook means for engaging said washer element in a manner by which force in a direction opposite the biasing force is transmitted by said gripping means to the stem yet force in the same direction as the biasing force is either not transmitted by said gripping means to the stem or only transmitted by said gripping means to the stem after at least a minimum movement of said gripping means.

27. Apparatus of claim 18, further comprising means for reversing said input force to said force means.

28. Apparatus of claim 18, further comprising means for halting said input force to said force means upon detection that said set point has been achieved and then for reversing said input force to said force means.

29. Apparatus for monitoring the set pressure of a valve coupled to a port in a pressure line having an internal pressure $P_L$, said port having an effective area A, wherein said valve includes a closure element movable between a first limit position sealing said port and a second limit position opening said port, and includes a spring loaded means for exerting a biasing force biasing said closure element towards said first limit position, comprising:
   forcer means selectively operable to apply a pulling force to said closure element in the direction opposite to said bias provided by said springloaded means;
   force transducer for generating a force signal representative of the pulling force applied to the said closure element by said forcer means; and
   controller means selectively operable to control a set pressure calculating sequence, including:
      means for determining the internal pressure ($P_L$) of the line;
      means for activating said forcer means, and
      means for monitoring said force transducer, and for detecting from said monitored force that a set point has been achieved where the pulling force approximates the difference between the biasing force and the force on the closure element due to internal pressure in the chamber; and, in response to said detection, for disabling said forcer means, determining a force ($F_S$) representing the pulling force at said set point, and computing a signal $P_S$ representative of the set pressure of said valve in accordance with $$P_S = P_L + F_S/A$$

where $P_L$ is representative of said internal pressure, and A is representative of the effective area of said port.

30. Apparatus for measuring the set pressure of a valve coupled to the port of a pressure line, said valve having a closure element and a spring loaded means for exerting a biasing force biasing said closure element to a sealing position against said port, whereby said closure element is positioned to seal said port when the pressure within said line is less than said set pressure and said port is open other wise, comprising:
   means for performing a set pressure calculating sequence including:
      forcer means for applying a pulling force to said closure element in the direction opposite to said bias from said springloaded means,
      means for generating a force signal representative of the force applied over time to said closure element by said forcer means;
      means for detecting from observance of said force signal that a set point has been achieved where the pulling force approximates the difference between the biasing force and the force on the closure element due to internal pressure in the chamber;
      means for generating a pressure signal $P_L$ representative of the pressure within said line upon said detection;
      means for determining a force ($F_S$) representating the pulling force at said set point; and
      means for generating a signal representative of the set pressure characteristic of said valve, said set pressure corresponding to the sum of the pressure in said line and the ratio $F_S/A$, where A is representative of the effective area of said port.

* * * * *